H. O. HEM.
DASH POT.
APPLICATION FILED OCT. 22, 1915.
1,280,727.
Patented Oct. 8, 1918.
3 SHEETS—SHEET 1.
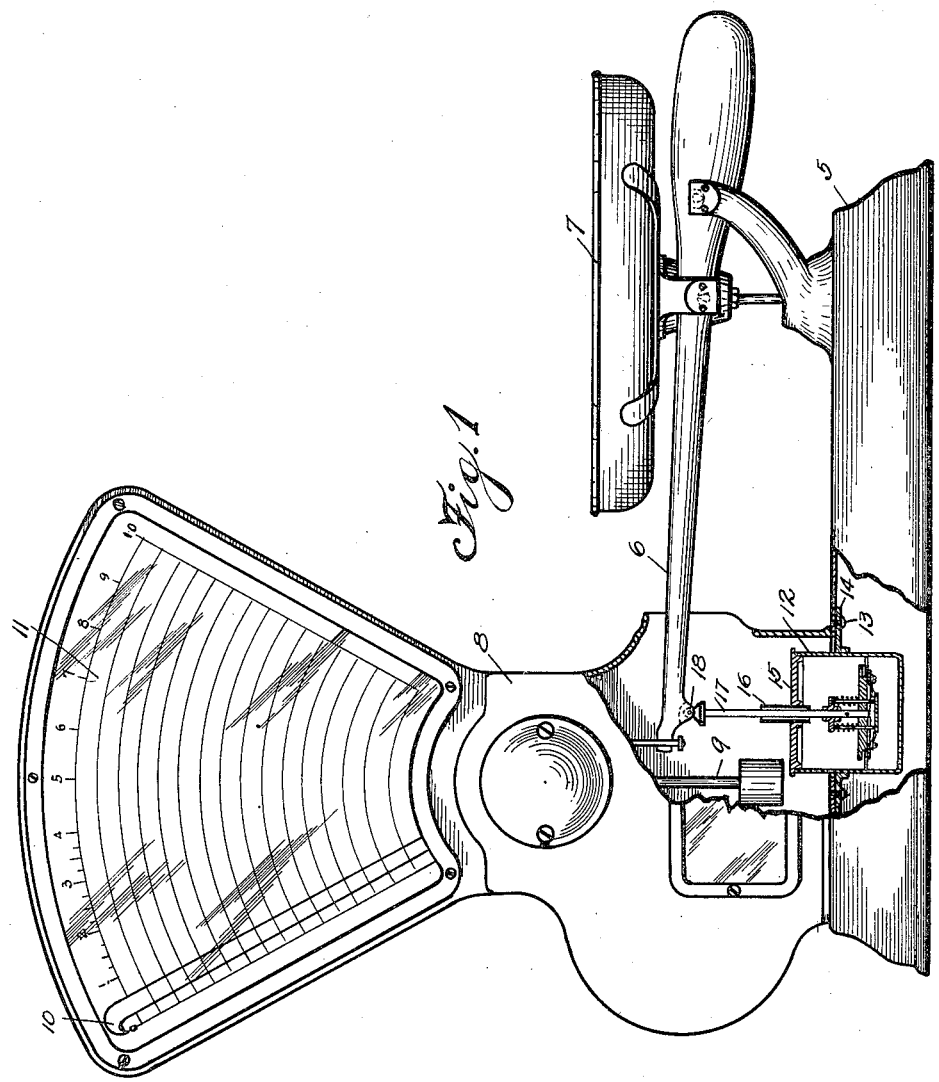

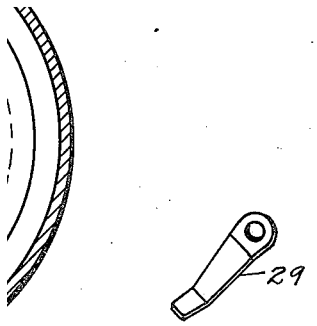
Fig. 4.
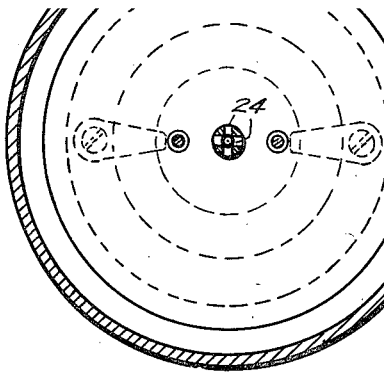
Fig. 3.
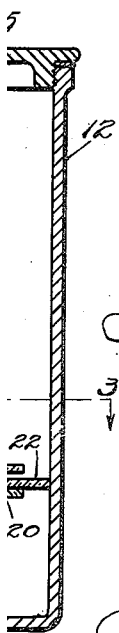
Fig. 2.
Inventor
Halvor O. Hem
George R. Frye
ATTORNEY
Witnesses.
Carl Jinke
W. G. Neuman
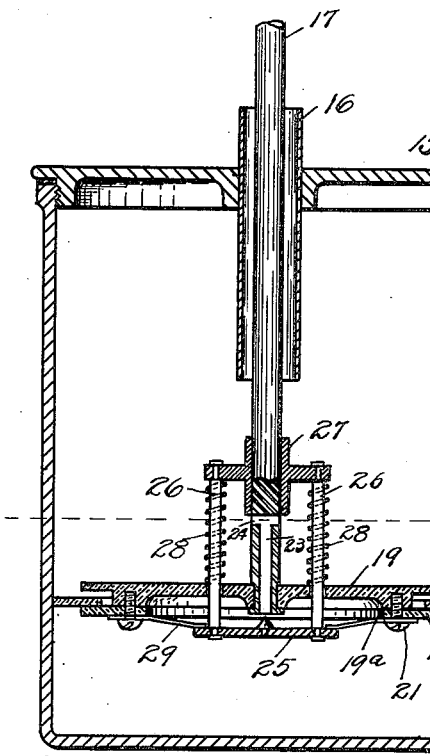

H. O. HEM.
DASH POT.
APPLICATION FILED OCT. 22, 1915.

1,280,727.

Patented Oct. 8, 1918.
3 SHEETS—SHEET 3.

UNITED STATES PATENT OFFICE.

HALVOR O. HEM, OF KANSAS CITY, MISSOURI, ASSIGNOR TO TOLEDO SCALE COMPANY, OF JERSEY CITY, NEW JERSEY, A CORPORATION OF NEW JERSEY.

DASH-POT.

1,280,727.      Specification of Letters Patent.      Patented Oct. 8, 1918.

Application filed October 22, 1915. Serial No. 57,253.

*To all whom it may concern:*

Be it known that I, HALVOR O. HEM, a citizen of the United States, residing at Kansas City, in the county of Jackson and State of Missouri, have invented certain new and useful Improvements in Dash-Pots, of which the following is a specification.

My invention relates to dash-pots or similar shock-absorbing devices, and is particularly designed for use in weighing scales. It is desirable to dampen and regulate the movement of the main beam and lever mechanism of an automatic weighing scale so as to prevent the transmission of shock from the goods-receiver to the load-counterbalancing mechanism, even though the goods be placed upon the receiver carelessly or with intentional violence. Despite the suddenness of the application of a load or the amount of pressure exerted upon the lever mechanism, the levers and counterbalancing mechanism should always move with a limited and substantially uniform speed, and the reverse movement, after the load has been removed, should also be made at a constant speed.

The dash-pot which forms the subject matter of the present application is particularly adapted to accomplish this regulation of the movement of the beam and lever mechanism of an automatic scale, though obviously it may be used in other connections where similar regulation is to be effected, and certain of its principles and features are applicable to dash-pots in general, as will more fully appear from the following detailed description of preferred embodiments of my invention illustrated in the accompanying drawings.

Figure 6:
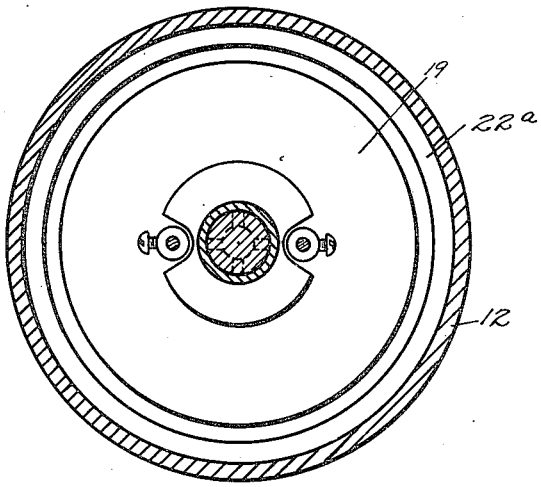
Figure 5:
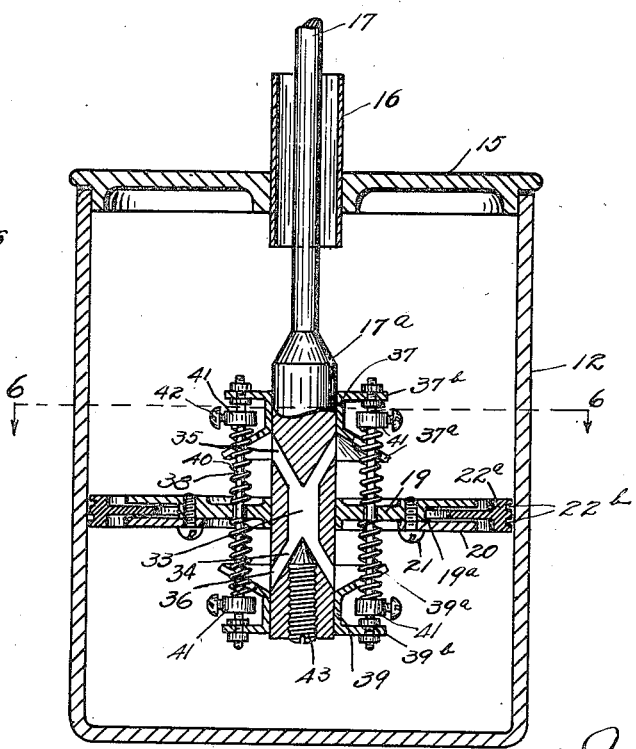

The accompanying drawings forming a part of this specification disclose preferred embodiments of my invention, Figure 1 representing in front elevation an automatic weighing scale to the main beam of which my improved dash-pot is connected, parts being broken away and shown in section; Fig. 2 representing an enlarged vertical section through the dash-pot; Fig. 3 representing a transverse section taken on the line 3—3 of Fig. 2; Fig. 4 showing a detail perspective view of one of the spring elements employed; Fig. 5 showing a vertical section through a second embodiment of my invention; and Fig. 6 showing a transverse section taken on the line 6—6 of Fig. 5.

It will not be necessary to give a detailed description of the particular type of computing scales here chosen for the purpose of illustrating the disclosed embodiments of my invention, because that type of scale is well known through extensive commercial use, and a considerable number of prior patents, for example, the De Vilbiss Reissue Patent No. 12,137, dated July 28, 1903. It is also to be understood that this type of weighing scale is selected merely for the purpose of illustration, and that my dash-pot may be used in connection with any suitable weighing scale, whether of the type shown, wherein the dash-pot plunger is directly connected with the scale beam, or of the platform type of scale, wherein platform-supporting lever mechanism and intermediate levers are employed, to which my dash-pot plunger may be suitably connected. Inasmuch as the present invention is not dependent for its operation upon any particular form of scale mechanism, no attempt is made in this application to show a complete scale mechanism, nor to delineate the action of the scale in its load-counterbalancing or weighing operations; only so much of the scale mechanism being shown as is necessary to clearly portray the operation and co-action of the scale mechanism with the dash-pot forming the claimed invention herein disclosed.

Referring to the drawings; 5 designates a suitable base above which is fulcrumed a scale beam 6 supporting a scale pan or platter 7 and connected within a housing 8 with a pendulum load-counterbalancing mechanism 9, to which is suitably connected an index arm 10 which swings over the graduated chart 11, upon which chart may be inscribed suitable price or value computations, as well as the weight-indicating graduations. Suitably secured to the base 5 of the scale and preferably arranged within the housing 8 is the cylinder 12 of the dash-pot, adapted to contain oil or other liquids. The cylinder preferably extends through an opening in the top of the base 5, and is secured to said base by means of set screws 13 passing through apertures in a flange 14 carried by the cylinder (see Fig. 1). A cap 15 is preferably threaded upon the upper extremity of the cylinder 12, and is formed with an enlarged central aperture through which extends an elongated sleeve 16 adapted to project for some little distance on both sides of the cap or cover 15 to prevent the accidental splashing of the oil from the cylinder. The plunger rod or stem 17 is preferably of smaller diameter than the sleeve 16 to allow lateral or swinging movements of the plunger rod without binding, and is pivotally connected at its upper extremity, as at 17, to the inner end of the scale beam 6.

Considering now the embodiment of my invention shown in Figs. 1–4, the piston 19 comprises a disk of less diameter than the cylinder 12, suitably secured upon the lower extremity of the plunger rod 17 and formed with a depending circular flange 19ª adapted to space the upper portion of the disk from a removable ring 20 suitably secured, as by set screws 21, upon the flange 19ª. A loose ring 22 of a thickness less than the height of the flange 19ª, as shown in Fig. 2, is arranged between the fixed ring 20 and the top of the piston 19, this loose ring 22 being formed with an outer diameter to closely fit within the cylinder 12, and with an inside diameter greater than that of the circular flange 19ª, so that a clearance is provided to allow for movement of the piston relatively to the loose ring 22 should lateral or wabbling movements of the scale beam be communicated to the plunger rod 17. Also, by virtue of the construction shown, relative movement is permitted between the loose ring 22 and piston 19 to allow the loose ring to rest against either the fixed ring 20 or the upper piston disk during the reciprocations of the piston. The plunger rod 17 is suitably bored to provide a passage for the oil or other liquid within the cylinder 12 during the reciprocations of the piston, preferably a vertical bore 23 being provided extending from an axial port at the lower end of the plunger rod to a series of radially-extending ports 24, (see Fig. 3) which extend from the periphery of the plunger rod to the longitudinal bore 23. A baffle plate 25 is arranged directly beneath the lower end of the plunger rod 17, and is connected by means of rods 26 passing through suitable apertures in the piston disk 19 with a sleeve 27 arranged to slide upon the plunger rod 17, and to partially close the radial ports 24 during its sliding movement toward the piston. Suitable coil springs 28 encircling the rods 26 serve to normally hold the sleeve 27 above the ports 24, as shown in Fig. 2, while leaf springs 29 suitably secured in position by means of the set screws 21 serve to partially resist the tension of the coil springs 28 so as to normally maintain the baffle plate 25 is spaced relation to the lower part of the longitudinal bore 23 of the passage.

In the operation of the scale whenever a load is placed upon the pan or platter 7, the inner end of the scale beam 6 is depressed, raising the pendulum mechanism and forcing the plunger rod 17 of the dash pot downwardly from the position shown in Fig. 1, whereupon the resistance offered by the liquid within the cylinder 12 forces the baffle plate 25 upwardly against the tension of the springs 29, thereby partially closing the lower part of the longitudinal bore 23 and choking the passage of the liquid through the longitudinal bore to the upper side of the piston 19. The loose ring 22 is at the same time forced upwardly from the position shown in Figs. 1 and 2 into contact with the upper disk of the piston. The baffle plate is held in close proximity to the lower port of the bore 23 as long as the pressure exerted upon the liquid is sufficient to overcome the resistance of the springs 29, but as soon as the pressure falls, the springs 29 force the baffle plate away from the lower port of the passage, allowing the liquid to flow more freely therethrough, and thereby enabling a further reduction of the pressure exerted upon the liquid to permit a further movement of the baffle plate away from the port. It will thus be seen that as the piston moves downwardly the speed of its travel is constant under varying pressure, the baffle plate and springs 29 acting in conjunction with the passage for the liquid to automatically regulate the speed of the movement. Similarly, when the load being weighed is removed from the scale pan the falling of the pendulum to its original position will serve to move the inner end of the scale beam and the plunger rod 17 upwardly. As the plunger rod and piston move upwardly, the liquid within the cylinder 12 is forced through the ports 24 and longitudinal bore 23 into contact with the upper surface of the baffle plate 25, exerting a downward pressure on said baffle plate sufficient to overcome the tension of the coil springs 28, thereby drawing the sleeve 27 downwardly to partially cover the ports 24, and so choking the inlet to the passage. As the pressure against the baffle plate 25 is diminished because of this partial closing of the ports 24, the springs 28 return the sleeve 27 toward its original position, thereby enlarging the inlet to the passage in accordance with the diminution in pressure and allowing a greater quantity of the liquid to pass to the lower side of the piston 19 until gradually the sleeve 27 is returned to its original position. The ports 24 will never be entirely closed, for the pressure exerted by the imtaining the outer periphery of the loose ring in close proximity to the wall of the cylinder 12.

If it is found to be desirable, other apertures may be formed in the piston 19 to allow the passage of liquid from one side to the other, or a plurality of automatically controlled passages may be employed in connection with a single piston, it being understood that the constructions herein illustrated disclose exemplifications of my invention which are susceptible to modification, variation and change within the scope of the subjoined claims.

Having described my invention, I claim:

1. In a dash-pot, the combination with a cylinder containing liquid, of a piston having a port for said liquid, and an element arranged to vary the area of the port actuated by the velocity of the liquid through the port, whereby the piston will move at a uniform velocity under varying pressures.

2. In a dash-pot, the combination with a cylinder containing liquid, of a piston having a port for said liquid, and an element normally spaced from the port and arranged to move toward the port to vary the area of the port, said element being actuated by the velocity of the liquid through the port, whereby the piston will move at a uniform velocity under varying pressures.

3. In a dash-pot, the combination with a cylinder containing liquid, and a piston having a passage for said liquid terminating in ports on opposite sides of the piston, and movable members adjacent the ports, and arranged to vary the area of the port, said members being actuated by the velocity of the liquid through the ports, whereby the piston will move at a uniform velocity under varying pressures.

4. In a dash-pot, the combination with a cylinder containing liquid, of a piston having a passage for said liquid, the ends of said passage terminating in ports on opposite sides of the piston, a movable member arranged on each side of the piston adjacent the ports of said passage, said members being connected for simultaneous movement to cover or uncover the ports of said passage during the movements of said piston.

5. In a dash-pot, the combination with a cylinder containing liquid, of a piston having a passage for said liquid, the ends of said passage terminating in ports on opposite sides of the piston, a movable member arranged on each side of the piston adjacent the ports of said passage, means normally holding said members in spaced relation to said ports, said members being connected for simultaneous movement to cover or uncover the ports of said passage during the movements of said piston.

6. In a dash-pot, the combination of a cylinder and piston, a plunger rod having a passage therein terminating in ports on opposite sides of the piston, a movable member arranged on each side of the piston adjacent the ports of said passage, said members being connected for simultaneous movement to cover or uncover the ports of said passage during the movements of said piston.

7. In a dash-pot, the combination of a cylinder and piston, a plunger rod having a passage therein terminating in ports on opposite sides of the piston, a movable member arranged on each side of the piston adjacent the ports of said passage, means normally holding said members in spaced relation to said ports, said members being connected for simultaneous movement to cover or uncover the ports of said passage during the movements of said piston.

8. In a dash-pot, the combination of a cylinder and piston, a plunger rod having a passage therein terminating in ports on opposite sides of the piston, a movable member having a baffle plate arranged adjacent the ports at one terminal of said passage, and a second movable member arranged adjacent the ports at the opposite terminal of said passage, said members being connected and movable conjointly to regulate the speed of movement of the piston under varying pressures.

9. In a dash-pot, the combination of a cylinder and piston, a plunger rod having a passage therein terminating in ports on opposite sides of the piston, a moving member having a baffle plate arranged adjacent one terminal of said passage, and a reciprocating sleeve arranged adjacent the opposite terminal of said passage, said sleeve being connected with said member and movable therewith to regulate the speed of movement of the piston under varying pressures.

10. In a dash-pot, the combination of a cylinder and piston, a plunger rod having a passage therein terminating in ports on opposite sides of the piston, a movable member having a baffle plate arranged adjacent one terminal of said passage, and a reciprocating sleeve arranged adjacent the opposite terminal of said passage, springs normally holding the movable member and sleeve away from said ports, said sleeve being connected with said member and movable therewith to regulate the speed of movement of the piston under varying pressures.

11. In a dash-pot, the combination of a cylinder and piston, a plunger rod connected to the piston and having a passage therein terminating in ports on opposite sides of the piston, and means for automatically regulating the speed of movement of the piston, including a movable member having a baffle plate adjacent one terminal of the passage, and a similar member adjacent the opposite terminal of said passage, said members bepact of the oil upon the upper face of the plate 25 serves to immediately force the sleeve 27 over a portion of the ports 24, thereby reducing the area for the entrance of the oil and so reducing the pressure upon the baffle plate. As the pressure is reduced because of the closing of the ports 24 the springs 28 return the sleeve 27 toward its original position, thereby increasing the area for the admission of the oil and again allowing the inflowing oil to exert pressure upon the baffle plate 25. Hence it will be seen that the movement of the piston will never be entirely stopped because of the closing of the ports 24.

In the embodiment shown in Figs. 5 and 6, the cylinder 12, plunger rod 17 and piston 19 are substantially identical with the corresponding elements in the embodiment shown in Figs. 1–4, and a similar fixed ring 20 is secured by screws 21 upon the lower face of the piston 19, being spaced from the upper portion of the piston by a circular flange $19^a$ as in the embodiment hereinbefore described. A floating ring $22^a$ is constructed and mounted relatively to the piston 19 substantially as is the loose ring 22 and differs from the loose ring 22 only in having circular oil-retaining grooves $22^b$ in its periphery, the peripheral face of the ring being extended to allow for the introduction of these grooves. The plunger rod 17 is preferably enlarged at its lower extremity, as shown at $17^a$, and the enlarged portion is formed with a central bore 33 from the opposite ends of which extend a plurality of smaller passages 34, which are preferably inclined as shown in Fig. 5 and terminate in ports for the admission and emission of the oil according to the direction of travel of the piston. A sleeve 37 loosely surrounds the piston rod and is normally maintained in position immediately above the ports 35 on the upper side of the piston 19, this sleeve being formed with a flaring baffle plate $37^a$ extending into the path of travel of the liquid issuing from the ports 35 and with a circular flange $37^b$ apertured to receive the upper extremities of the rods 38 which extend through apertures in the piston 19 and connect the sleeve 37 with a similar sleeve 39 loosely surrounding the piston rod on the lower side of the piston 19. The lower sleeve 39 is constructed with a flaring baffle plate $39^a$ projecting into the path of the liquid when issuing from the lower ports 36 and with a circular flange $39^b$ through which the lower extremities of the rods 38 are secured. Coil springs 40 surround the rods 38 on each side of the piston 19 and serve to normally maintain the sleeves 37 and 39 in the position shown in Fig. 5. The tension of the springs 40 may be suitably adjusted by moving the collars 41 longitudinally upon the rods 40 and securing them in their adjusted positions by set screws 42.

The lower extremity of the plunger rod 17 is preferably formed with a threaded bore adapted to receive the adjusting screw 43, which is formed with a cone-shaped point adapted to project into the central bore 33 and regulate the size of the openings leading to the passages 34.

In the operation of the embodiment shown in Fig. 5 one of the sleeves 37 or 39 is moved into position to partially close the adjacent ports according to the direction of travel of the piston. When the piston 19 is traveling upwardly the liquid entering through the ports 35 will issue through the ports 36 and impinge upon the flaring baffle plate $39^a$ of the sleeve 39, the pressure exerted thereby tending to move the sleeve 39 downwardly, which downward movement is transmitted through the connecting rods 38 to the upper sleeve 37, drawing the sleeve 37 downwardly against the tension of the springs 40 to partially cover the ports 35, thereby decreasing the area for the admission of the oil into the central bore 33. The partial closing of the ports 35 serves to diminish the pressure exerted by the flow of liquid and allows the springs 40 to return the sleeve 37 toward its original position, thereby increasing the area of admission into the ports 35. Upon the movement of the piston 19 downwardly the sleeve 39 is similarly moved to partially close the ports 36 when the pressure is sufficiently great, and to again open them when the pressure falls. It will be observed that in this embodiment the ports 35 or 36 can never be completely closed for reasons similar to those stated in connection with the first-mentioned embodiment.

It will thus be seen that the travel of the piston and plunger rod of my improved dash-pot is constant under varying pressures, any change in pressure effecting a corresponding change in position of the elements of my dash-pot so as to automatically counteract the pressure change, while the dash-pot elements automatically adjust themselves during a gradual increase or decrease of pressure. Should unusual shocks or misuse of the scale effect a wabbling of the scale beam, this wabbling would not affect the operation of my dash-pot, as the clearance provided between the inner diameter of the loose rings 22 and $22^a$ and the outer wall of the flange $19^a$ and between the upper disk 19 and the fixed ring 20 allows the plunger rod 17 and piston 19 to move laterally with respect to the loose ring, and also to swing relatively to the loose ring so that the lower wall of the upper piston disk may contact the upper face of the loose ring on one side of the piston while the upper face of the fixed ring 20 at the opposite side of the piston will contact with the lower face of the loose ring. This construction permits of great flexibility of movement while always maining directly connected and movable conjointly to cover or uncover the adjacent ports of said passage according to the pressure exerted upon the baffle plates.

12. In a dash-pot, the combination of a cylinder and piston, a plunger rod connected to the piston and having a passage therein terminating in ports on opposite sides of the piston, and means for automatically regulating the speed of movement of the piston, including a movable sleeve having a baffle plate adjacent one terminal of the passage, and a slidable sleeve surrounding the plunger rod adjacent the opposite terminal of said passage, said sleeves being directly connected and movable to cover or uncover the adjacent ports of said passage according to the pressure exerted upon said baffle plate.

13. In a dash-pot, the combination of a cylinder and piston, a plunger rod connected to the piston and having a passage therein terminating in ports on opposite sides of the piston, and means for automatically regulating the speed of movement of the piston, including a slidable sleeve having a baffle plate adjacent one terminal of the passage, and a slidable sleeve surrounding the plunger rod adjacent the opposite terminal of said passage, springs normally holding the sleeves away from said ports, said sleeves being directly connected and movable to cover or uncover the adjacent ports of said passage according to the pressure exerted upon the baffle plates.

14. In a dash-pot, the combination with a cylinder containing liquid, of a cap on the cylinder having an opening therein, a plunger rod of less diameter than the opening and passing therethrough, a piston of less diameter than the cylinder, a floating member fitting snugly within the cylinder and mounted loosely on the piston and rod, whereby the piston will have freedom to move laterally independently of the floating member.

15. In a dash-pot, the combination with a cylinder, of a cap on the cylinder having an opening therein, a plunger rod of less diameter than the opening and passing therethrough, a floating ring, the outer periphery of which fits snugly within the cylinder, a piston on said rod comprising a disk of less diameter than said cylinder and formed with a circular flange of less diameter than the inner periphery of said ring, and a fixed ring adapted to be secured to said piston below the floating ring, and spaced from said disk a distance greater than the thickness of said floating ring.

HALVOR O. HEM.

Witnesses:
RUSSELL J. BODMAN,
GEORGE R. FRYE.